US006778813B1

(12) United States Patent
Lilly

(10) Patent No.: US 6,778,813 B1
(45) Date of Patent: Aug. 17, 2004

(54) AUDIO SYSTEM/CUP ASSEMBLY

(76) Inventor: Kirk W. Lilly, 1332 E. Halifax, Mesa, AZ (US) 85203

( * ) Notice: Subject to any disclaimer, the term of this patent is extended or adjusted under 35 U.S.C. 154(b) by 617 days.

(21) Appl. No.: 09/778,575

(22) Filed: Feb. 7, 2001

(51) Int. Cl.[7] .................................................. H04B 1/38

(52) U.S. Cl. ...................... 455/90.3; 455/344; 220/737; 340/692

(58) Field of Search ................................ 455/90.3, 344, 455/345, 346, 347, 351, 66.1; 340/692, 693.5; 220/737, 741; 206/139

(56) References Cited

U.S. PATENT DOCUMENTS 3,541,452 A 11/1970 Disesa et al.
4,279,342 A 7/1981 Van Pelt
4,571,740 A 2/1986 Kirby et al.
4,700,395 A 10/1987 Long
4,792,994 A 12/1988 Aylward
5,070,539 A * 12/1991 Cheng ........................ 455/344
6,104,292 A * 8/2000 Rombom et al. ........ 340/573.1
6,140,932 A * 10/2000 Frank et al. ................ 340/692
2001/0041945 A1 * 11/2001 Lo et al. ....................... 700/94

* cited by examiner

*Primary Examiner*—Lee Nguyen
(74) *Attorney, Agent, or Firm*—John D. Lister

(57) ABSTRACT

An audio system/cup assembly includes a cup for holding a beverage; a removable audio system base; and may also include a removable adaptor base for enabling the cup to be placed in a vehicle cup holder. The cup has a threaded opening in the underside of the cup for securing the audio system base or the adaptor base to the cup. The audio system base and the adaptor base each have an upper portion that threads into the threaded opening in the underside of the cup to secure the base to the cup. Preferably, the cup has a handle and the threaded upper portion of the audio system base mates with the threaded interior surface of the threaded opening in the underside of the cup to locate the audio system controls toward and the speaker(s) facing away from a person holding the audio system/cup assembly when the audio system base is fully threaded into the threaded opening in the underside of the cup.

17 Claims, 1 Drawing Sheet

AUDIO SYSTEM/CUP ASSEMBLY

BACKGROUND OF THE INVENTION

The present invention relates to an audio system/cup assembly, and, in particular, to an audio system/cup assembly wherein the audio system forms a base of the assembly that is securely mounted on the cup when in use, but easily separated from the cup to enable the cup to be washed, batteries to be replaced, etc.

Workmen and other persons spending considerable amounts of time at a building site, sporting event, out of doors for hunting or picnicking, and at similar locations or performing similar activities often desire to have a beverage available for consumption and to listen to music, sports, news, weather, etc. U.S. Pat. No. 4,792,994, issued Dec. 20, 1988, discloses a radio equipped thermos wherein a standard thermos member is connected to a radio member. However, the radio member is either permanently affixed by super adhesive to the thermos member or releasably secured to the thermos member by a magnetic disk or a resilient skirt. A thermos member with a radio permanently affixed to the thermos member renders the thermos member difficult to wash. The thermos member can not merely be placed in a dishwasher without possible damage to the radio. A thermos member releasably connected to a radio member by a magnet requires the thermos member to include either a metal element or a magnet, may increase the cost of the assembly, and depending on the strength of the magnet and how rough the radio equipped thermos is used, may result in the untimely separation of the thermos from the radio. A thermos member releasably connected to a radio member by a resilient skirt requires the thermos member or the radio to include a resilient skirt, may increase the cost of the assembly, and depending on the of the resilience of the skirt and how rough the radio equipped thermos is used, may result in the untimely separation of the thermos from the radio. Thus, while the radio equipped thermos of the '994 patent is useful, the radio equipped thermos of the '994 patent presents several problems in care and use which are solved by the radio-cup of the present invention.

SUMMARY OF THE INVENTION

The audio system/cup assembly of the present invention includes a cup for holding a beverage; a removable audio system base; and may also include a removable adaptor base for enabling the cup assembly to be placed in a vehicle cup holder. The audio system base may include: a radio, a mp player for downloading and storing a muser's favorite music from a computer that can be played whenever the user desires, a micro cassette player, and other conventional audio systems. The cup has a threaded opening in the underside of the cup for securing the audio system base or the adaptor base to the cup. The audio system base and the adaptor base each have an upper portion that threads into the threaded opening in the underside of the cup to secure the base to the cup. Preferably, the cup has a handle and the threaded upper portion of the audio system base mates with the threaded interior surface of the threaded opening in the underside of the cup to locate the audio system with the controls facing toward and the speaker(s) facing away from a person holding the audio system/cup assembly when the audio system base is fully threaded into the threaded opening in the underside of the cup. In addition, preferably, the audio system base is greater in diameter than the cup to provide a more stable assembly when the audio system/cup assembly is placed on a surface; for ease of access, the battery or batteries which power the audio system within the audio system base are contained in the upper portion of the audio system base that threads into the underside of the cup; and for better radio signal reception, the radio antenna is an annular antenna, with a diameter greater than the cup, located in an upper surface of the audio system base.

DESCRIPTION OF THE PREFERRED EMBODIMENTS

Figure 1:
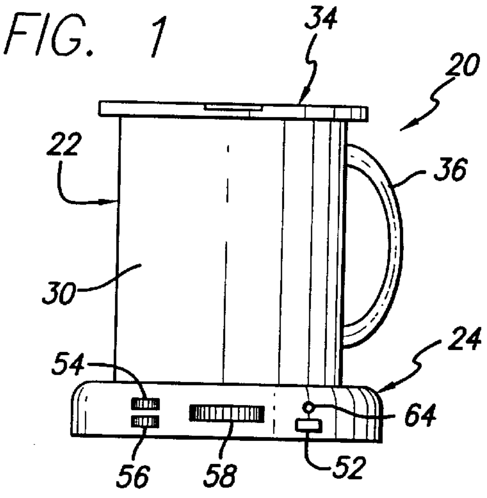
FIG. 1 is a side view of a first side of a audio system/cup assembly of the present invention.
Figure 2:
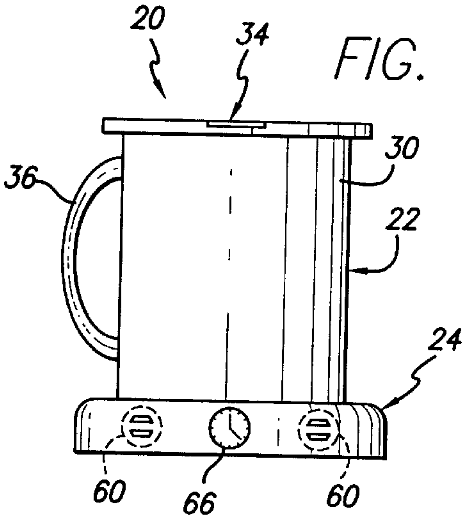
FIG. 2 is a side view of a second side of the audio system/cup assembly of FIG. 1.
Figure 3:
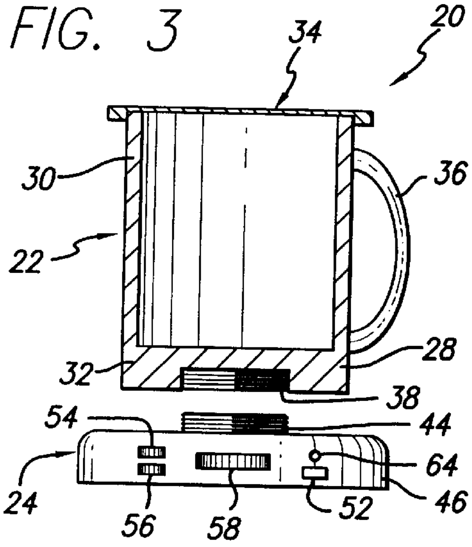
FIG. 3 is an exploded side view, partially in section, of the first side of the audio system/cup assembly of FIG. 1.
Figure 4:
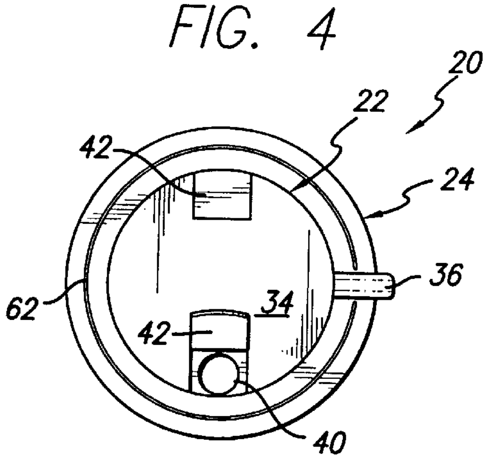
FIG. 4 is a plan view of the audio system/cup assembly of FIG. 1 with one cover flap on the lid opened for consuming a beverage.
Figure 5:
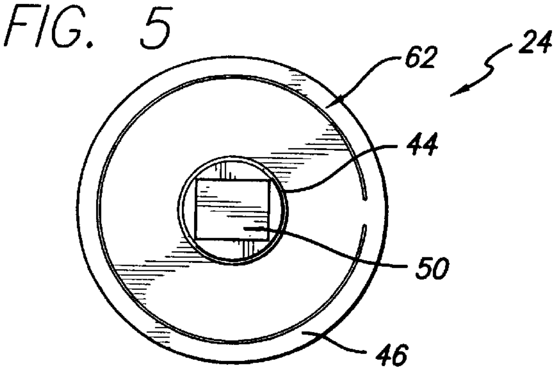
FIG. 5 is a plan view of an audio system base of the audio system/cup assembly of FIGS. 1 to 4.
Figure 6:
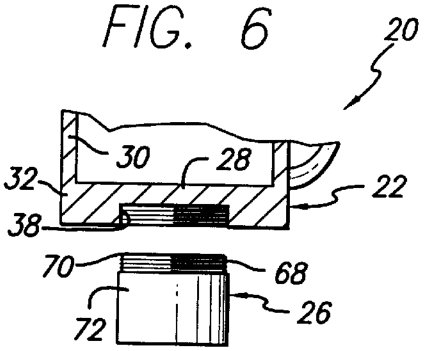
FIG. 6 is a partial exploded side view, with the lower portion of the cup in section, of a cup and adaptor base of the present invention.

As shown in FIGS. 1 to 5, the audio system/cup assembly 20 of the present invention includes a cup member 22 for holding a beverage; a removable audio system base member 24; and may also include, as shown in FIG. 6, a removable adaptor base member 26 for enabling the cup member 22 of the audio system/cup assembly 20 to be placed in a vehicle cup holder.

The cup member 22 has a bottom wall 28; a first or upper tubular sidewall 30 extending upward from the bottom wall 28; a second or lower tubular sidewall 32 extending downward from the bottom wall 28; and, preferably, a removable lid 34. The upper tubular sidewall 30 may be a conventional thermally insulated sidewall to keep a beverage within the cup member 22 hot or cold, such as but not limited to a standard thermos sidewall, or the upper tubular sidewall may be an uninsulated sidewall. Preferably, the upper sidewall 30 is provided with an integral handle, such as the handle 36 shown in FIGS. 1 to 4. The inner surface 38 of the lower tubular sidewall 32 is threaded to form a threaded opening in the underside of the cup member 22 for securing a the removable audio system base member 24 or the removable adaptor base member 26 to the cup member 22.

Preferably, the cup member 22 is made of a conventional plastic material commonly used to make reusable beverage cups and the bottom wall 28, the upper sidewall 30 and the lower sidewall 32 are integral. Preferably, the removable lid 34 is also made of plastic and snaps onto or is threaded into the upper end of the upper cup sidewall 30 to close the upper cup opening and keep a beverage from spilling from the cup member. Preferably, the lid 34 is provided with openings 40 with conventional closure flaps 42 to enable a beverage to be consumed from the cup member 22 without removing the lid 34. A typical cup member is from about three and one half to about five inches in diameter and from about five inches to about ten inches in height and holds from about sixteen ounces to about sixty four ounces of beverage.

The audio system base member 24 has an upper portion 44 for securing the audio system base member to the cup member 22 and, preferably, for housing a battery or batteries to power the audio system within the audio system base member 24, and a lower portion 46 for housing the audio system and providing the audio system/cup assembly 20 with greater stability. The audio system of the audio system base member 24 may be powered by convention disposable batteries, such as but not limited to two or four AA batteries, or by a conventional rechargeable battery. The audio system housed within the audio system base member may be or include: an AM and/or FM radio; an MP3 digital audio player which can download and store a person's favorite music from a computer to be listened to whenever the person desires, such as a digital audio player of the type marketed by Rio Digital Audio under the trade designation Rio 800 MP3 Player; a micro cassette player; and/or other audio systems.

Preferably, the housing of the audio system base member is made of a conventional plastic material commonly used to make audio system housings, such as radio, cassette player housings, etc. The upper portion 44 of the audio system base member 24 has a threaded cylindrical exterior surface 48 that threads into the threaded opening in the underside of the cup member 22 to secure the audio system base member 24 to the cup member 22 and unthreads from the threaded opening in the underside of the cup member 22 to separate the audio system base member 24 from the cup member 22 e.g. so that the cup member 22 may be washed in a dishwasher and/or batteries may be inserted into or removed from the audio system base member 24. As shown, in FIG. 5, preferably, the upper end of the upper portion 44 of the audio system base member has a lid 50 that snaps into place, but may be removed to insert a battery or batteries into and/or remove a battery or batteries from the upper portion of the audio system base member 24. The lower portion 46 of the audio system base member 24 contains standard audio system components. For example, where the audio system is a radio, the radio includes a receiver, an on/off switch 52, a volume control 54, a tuner control 56 (station or frequency control), a dial 58, a speaker or speakers 60 (e.g. 1.6 watt speakers), an antenna 62 and a headphone jack 64. The audio system base member 24 may also include a clock 66. The audio system components are connected together and to the battery power source in a conventional manner and, while it is preferred to house the battery or batteries forming the power source in the upper portion 44 of the audio system base member for ease of access, the battery or batteries may be housed within the lower portion 46 of the audio system base member 24.

Preferably, the lower portion 46 of the audio system base member 24 housing the audio system components has a generally cylindrical exterior sidewall and, preferably, is equal to or greater in exterior diameter (e.g. about one half to about one inch greater in diameter) than the exterior diameter of the cup member 22 to stabilize the audio system/cup assembly 20 when the audio system/cup assembly, is placed on a surface. When the audio system is or includes a radio, preferably, the radio antenna 62 is an annular radio antenna, as shown in FIGS. 4 and 5, and is located in an upper surface of the lower portion 46 of the audio system base member. As shown, the annular radio antenna 62 has a diameter greater than the exterior diameter of the cup member 22 whereby the antenna 62 is exposed to enhance the reception of radio signals.

In a preferred embodiment of the invention, the cup member 22 is equipped with a handle such as but not limited to the vertically extending handle 36 on the exterior surface of the upper tubular sidewall 30; the controls of the audio system (e.g. the on/off switch 52, the volume control 54, and the tuner control 56) are located on the exterior sidewall of the lower portion of the audio system base member; and the threaded upper portion 44 of the audio system base member 24 mates with the threaded interior surface of the threaded opening in the underside of the cup member 22 to locate the audio system controls (e.g. the on/off switch 52, the volume control 54, and the tuner control 56) toward a person holding the audio system cup assembly in his/her right hand or in his/her left hand when the upper portion 44 audio system base member 24 is fully threaded into the threaded opening in the underside of the cup member 22.

In another preferred embodiment of the invention, the cup member 22 is equipped with a handle such as but not limited to the vertically extending handle 36 on the exterior surface of the upper tubular sidewall 30; the audio system controls (e.g. the on/off switch 52, the volume control 54, and the tuner control 56) are located on one side of the exterior sidewall of the lower portion 46 of the audio system base member; the speaker or speakers 60 are located facing the opposite side of the exterior sidewall of the lower portion 46 of the audio system base member; and the threaded upper portion 44 of the audio system base member 24 mates with the threaded interior surface of the threaded opening in the underside of the cup member 22 to locate the audio system controls (e.g. the on/off switch 52, the volume control 54, and the tuner control 56) facing toward and the speaker(s) 60 facing away from a person holding the radio-cup assembly in his/her right hand or in his/her left hand when the upper portion 44 audio system base member 24 is fully threaded into the threaded opening in the underside of the cup member 22.

While the above orientation of the cup handle 36 relative to the audio system controls and speakers 60 is preferred, the orientation of the audio system controls and speakers 60 relative to the handle 36, when the audio system base member 24 is fully threaded into the cup member 22 may orient the controls and speakers in other directions, e.g. the controls could be under and aligned with the handle 36 with the speakers 60 facing away from the handle.

Since the cup member 22 and audio system base member 24 of the audio system/cup assembly 20 are typically greater in diameter than cup holders provided in cars, pickup trucks, etc, preferably, the audio system/cup assembly 20 includes the removable adaptor base member 26. The removable adaptor base member 26 may be substituted for the audio system base member 24 for use in holding the audio system/cup assembly in a vehicle cup holder smaller in diameter than the exterior diameter of the cup member. The removable adaptor base member 26 has an upper portion 68 with a threaded cylindrical exterior surface 70 that threads into the threaded opening in the underside of the cup member 22 to secure the removable adaptor base member to the cup member 22 and a lower portion 72, with a cylindrical exterior surface having a diameter less than the exterior diameter of the cup member 22 (e.g. an exterior diameter of about three inches), to be inserted in a vehicle cup holder.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An audio system/cup assembly comprising:

a cup member for holding a beverage; the cup member having an exterior diameter; the cup member having a bottom wall; the cup member having a first tubular sidewall extending upward from the bottom wall; the cup member having a second tubular sidewall extending downward from the bottom wall; the inner surface of the second tubular sidewall being threaded to form a threaded opening in the underside of the cup member for securing a first removable base member to the cup member; and the first removable base member being an audio system base member having an upper portion and a lower portion; the upper portion having a threaded cylindrical exterior surface that threads into the threaded opening in the underside of the cup member to secure the audio system base member to the cup member; the upper portion of the audio system base member being a battery housing for housing a battery to power the audio system; the lower portion of the audio system base member housing the audio system components of the audio system and having a generally cylindrical exterior sidewall and is greater in exterior diameter than the exterior diameter of the cup member to stabilize the audio system cup assembly when the audio system cup assembly is placed on a surface; an annular radio antenna being located in an upper surface of the lower portion of the audio system base member, and the annular radio antenna having a diameter greater than the exterior diameter of the cup member whereby the antenna is exposed to enhance reception of radio signals.

2. The audio system/cup assembly of claim 1, wherein:

the cup member has a vertically extending handle on the upper tubular sidewall; the audio system base member has audio system controls on the exterior sidewall of the lower portion of the audio system base member, and the threaded upper portion of the radio base member mates with the threaded interior surface of the threaded opening in the underside of the cup member to locate the audio system controls toward a person holding the audio system/cup assembly in his/her right hand when the audio system base member is fully threaded into the threaded opening in the underside of the cup member.

3. The audio system/cup assembly of claim 1, wherein:

the cup member has a vertically extending handle on the exterior surface of the upper tubular sidewall; the audio system base member has audio system controls on one side of the exterior sidewall of the lower portion of the audio system base member and a speaker facing toward the opposite side of the exterior sidewall of the lower portion of the audio system base member; and the threaded upper portion of the audio system base member mates with the threaded interior surface of the threaded opening in the underside of the cup member to locate the audio system controls toward and the speaker facing away from a person holding the radio-cup assembly in his/her right hand when the audio system base member is fully threaded into the threaded opening in the underside of the cup member.

4. The audio system/cup assembly of claim 1, wherein:

the cup member has a vertically extending handle on the upper tubular sidewall; the audio system base member has audio system controls on the exterior sidewall of the lower portion of the audio system base member; and the threaded upper portion of the audio system base member mates with the threaded interior surface of the threaded opening in the underside of the cup member to locate the audio system controls toward a person holding the audio system/cup assembly in his/her left hand when the audio system base member is fully threaded into the threaded opening in the underside of the cup member.

5. The audio system/cup assembly of claim 1, wherein:

the cup member has a vertically extending handle on the exterior surface of the upper tubular sidewall; the audio system base member has audio system controls on one side of the exterior sidewall of the lower portion of the audio system base member and a speaker facing the opposite side of the exterior sidewall of the lower portion of the audio system base member; and the threaded upper portion of the audio system base member mates with the threaded interior surface of the threaded opening in the underside of the cup member to locate the audio system controls toward and the speaker facing away from a person holding the audio system/cup assembly in his/her left hand when the audio system base member is fully threaded into the threaded opening in the underside of the cup member.

6. An audio system/cup assembly comprising:

a cup member for holding a beverage; the cup member having an exterior diameter; the cup member having a bottom wall; the cup member having a first tubular sidewall extending upward from the bottom wall; the cup member having a second tubular sidewall extending downward from the bottom wall; the inner surface of the second tubular sidewall being threaded to form a threaded opening in the underside of the cup member for securing a removable base member to the cup member;

the removable base member being an audio system base member having an upper portion and a lower portion; the upper portion having a threaded cylindrical exterior surface that threads into the threaded opening in the underside of the cup member to secure the audio system base member to the cup member; and the cup member having a vertically extending handle on the exterior surface of the upper tubular sidewall; the audio system base member having audio system controls on the exterior sidewall of the lower portion of the audio system base member; and the threaded upper portion of the audio system base member mating with the threaded interior surface of the threaded opening in the underside of the cup member to locate the audio system controls in a preselected position relative to a person holding the audio system cup assembly in his/her right hand when the audio system base member is fully threaded into the threaded opening in the underside of the cup member.

7. The audio system/cup assembly of claim 6, wherein:

the preselected position locates the audio system controls toward a person holding the audio system cup assembly in his/her right hand when the audio system base member is fully threaded into the threaded opening in the underside of the cup member.

8. The audio system/cup assembly of claim 6, wherein:

the audio system controls of the audio system base member are on one side of the exterior sidewall of the lower portion of the audio system base member and a speaker faces the opposite side of the exterior sidewall of the lower portion of the audio system base member; and the preselected position locates the audio system controls toward and the speaker facing away from a person holding the audio system/cup assembly in his/her right hand when the audio system base member is fully threaded into the threaded opening in the underside of the cup member.

9. The audio system/cup assembly of claim 8, wherein:

the upper portion of the audio system base member is a battery housing for a battery to power the audio system.

10. The audio system/cup assembly of claim 8, wherein:

the lower portion of the audio system base member housing the audio system components has a generally cylindrical exterior sidewall and is greater in exterior diameter than the exterior diameter of the cup member to stabilize the audio system/cup assembly when the audio system/cup assembly is placed on a surface.

11. An audio system/cup assembly comprising:

a cup member for holding a beverage; the cup member having an exterior diameter; the cup member having a bottom wall; the cup member having a first tubular sidewall extending upward from the bottom wall; the cup member having a second tubular sidewall extending downward from the bottom wall; the inner surface of the second tubular sidewall being threaded to form a threaded opening in the underside of the cup member for securing a first removable base member to the cup member;

the first removable base member being an audio system base member having an upper portion and a lower portion; the upper portion having a threaded cylindrical exterior surface that threads into the threaded opening in the underside of the cup member to secure the audio system base member to the cup member; and a second removable base member to be substituted for the audio system base member for use in holding the audio system/cup assembly in a vehicle cup holder smaller in diameter than the exterior diameter of the cup member; the second removable base member having an upper portion with a threaded cylindrical exterior surface that threads into the threaded opening in the underside of the cup member to secure the second removable base member to the cup member and a lower portion, with a cylindrical exterior surface having a diameter less than the exterior diameter of the cup member, to be inserted in a vehicle cup holder.

12. An audio system/cup assembly comprising:

the a cup member for holding a beverage; the cup member having an exterior diameter; the cup member having a bottom wall; the cup member having a first tubular sidewall extending upward from the bottom wall; the cup member having a second tubular sidewall extending downward from the bottom wall; the inner surface of the second tubular sidewall being threaded to form a threaded opening in the underside of the cup member for securing a removable base member to the cup member;

the removable base member being an audio system base member having an upper portion and a lower portion; the upper portion having a threaded cylindrical exterior surface that threads into the threaded opening in the underside of the cup member to secure the audio system base member to the cup member; and the cup member having a vertically extending handle on the exterior surface of the upper tubular sidewall; the audio system base member having audio system controls on the exterior sidewall of the lower portion of the audio system base member; and the threaded upper portion of the audio system base member mating with the threaded interior surface of the threaded opening in the underside of the cup member to locate the audio system controls in a preselected position relative to a person holding the audio system cup assembly in his/her left hand when the audio system base member is fully threaded into the threaded opening in the underside of the cup member.

13. The audio system/cup assembly of claim 12, wherein:

the preselected position locates the audio system controls toward a person holding the audio system/cup assembly in his/her left hand when the audio system base member is fully threaded into the threaded opening in the underside of the cup member.

14. The audio system/cup assembly of claim 12, wherein:

the audio system controls of the audio system base member are on one side of the exterior sidewall of the lower portion of the audio system base member and a speaker faces the opposite side of the exterior sidewall of the lower portion of the audio system base member; and the preselected position locates the audio system controls toward and the speaker facing away from a person holding the audio system/cup assembly in his/her left hand when the audio system base member is fully threaded into the threaded opening in the underside of the cup member.

15. The audio system/cup assembly of claim 14, wherein:

the upper portion of the audio system base member is a battery housing for a battery to power the audio system.

16. The audio system/cup assembly of claim 14, wherein:

the lower portion of the audio system base member housing the audio system components has a generally cylindrical exterior sidewall and is greater in exterior diameter than the exterior diameter of the cup member to stabilize the audio system/cup assembly when the audio system/cup assembly is placed on a surface.

17. An audio system/cup assembly comprising:

a cup member for holding a beverage; the cup member having an exterior diameter; the cup member having a bottom wall; the cup member having a first tubular sidewall extending upward from the bottom wall; the cup member having a second tubular sidewall extending downward from the bottom wall; the inner surface of the second tubular sidewall being threaded to form a threaded opening in the underside of the cup member for securing a removable base member to the cup member;

the removable base member being an audio system base member having an upper portion and a lower portion; the upper portion having a threaded cylindrical exterior surface that threads into the threaded opening in the underside of the cup member to secure the audio system base member to the cup member; and the cup member having a vertically extending handle on the exterior surface of the upper tubular sidewall; the audio system base member having audio system controls on one side of the exterior sidewall of the lower portion of the audio system base member and a speaker facing the opposite side of the exterior sidewall of the lower portion of the audio system base member; and the threaded upper portion of the audio system base member mating with the threaded interior surface of the threaded opening in the underside of the cup member to locate the audio system controls and the speaker in preselected positions relative to a person holding the audio system/cup assembly in his/her right hand when the audio system base member is fully threaded into the threaded opening in the underside of the cup member.

* * * * *